(12) United States Patent
Buck et al.

(10) Patent No.: US 11,047,488 B2
(45) Date of Patent: Jun. 29, 2021

(54) SEAL WITH RETAINING PROFILE

(71) Applicant: M & M Oil Tools, LLC, Breaux Bridge, LA (US)

(72) Inventors: David A. Buck, Arnaudville, LA (US); Andy Paul Todd, Lafayette, LA (US); Sythonh Sysavath, Breaux Bridge, LA (US); Jon David Hurst, Lafayette, LA (US)

(73) Assignee: M & M Oil Tools, LLC, Breaux Bridge, LA (US)

( * ) Notice: Subject to any disclaimer, the term of this patent is extended or adjusted under 35 U.S.C. 154(b) by 0 days.

(21) Appl. No.: 16/215,041

(22) Filed: Dec. 10, 2018

(65) Prior Publication Data

US 2019/0178392 A1    Jun. 13, 2019

Related U.S. Application Data

(60) Provisional application No. 62/596,296, filed on Dec. 8, 2017.

(51) Int. Cl.
*F16K 5/06* (2006.01)
*E21B 1/00* (2006.01)

(52) U.S. Cl.
CPC ............. *F16K 5/0668* (2013.01); *E21B 1/00* (2013.01); *F16K 5/0689* (2013.01); *E21B 2200/04* (2020.05)

(58) Field of Classification Search
CPC .... F16K 5/0673; F16K 5/0678; F16K 5/0689; F16K 5/0668; F16K 5/0642; F16K 1/425;
(Continued)

(56) References Cited

U.S. PATENT DOCUMENTS 3,460,802 A    8/1969 Colby et al.
3,667,727 A    6/1972 Bowden
(Continued)

FOREIGN PATENT DOCUMENTS

DE         3740368 A1 *  6/1989  .......... F16K 5/0673
FR         2594202 A1 *  8/1987  .......... F16K 5/0673
WO    WO-2012138238 A1 * 10/2012  .......... F16K 5/0678

OTHER PUBLICATIONS

PCT Application No. US2018/64753; International Search Report and Written Opinion of the International Searching Authority for Applicant David A. Buck dated Feb. 27, 2019.

*Primary Examiner* — Hailey K. Do
(74) *Attorney, Agent, or Firm* — Jones Walker LLP

(57) ABSTRACT

A valve seat for a ball valve. The valve seat having a valve seat body with a circumferential concave seating surface configured to mate with a curvature of the valve ball. A seal pocket formed within the valve seat body, the seal pocket having (i) an throat formed in the concave seating surface, (ii) an outer pocket sidewall, and (iii) an inner pocket sidewall. A retaining groove positioned below the throat on either the outer pocket sidewall or the inner pocket sidewall and a flexible seal element shaped for positioning in the seal pocket. The seal element includes (i) an extended lip configured to rest within the retaining groove when the seal element is seated in the seal pocket, and (ii) a sealing face with an upper end laying below the valve seat's concave seating surface and a mid-portion extending upward above a curvature path of the concave seating surface.

13 Claims, 10 Drawing Sheets

(58) Field of Classification Search
CPC . F16K 1/465; F16K 5/20; F16K 5/204; F16K 5/205
See application file for complete search history.

(56) References Cited

U.S. PATENT DOCUMENTS

| | | |
|---|---|---|
| 3,760,833 A | 9/1973 | Kemp et al. |
| 5,419,532 A | 5/1995 | Fan |
| 2010/0200791 A1 | 8/2010 | Yung et al. |
| 2016/0319940 A1 | 11/2016 | Funato et al. |

* cited by examiner

SEAL WITH RETAINING PROFILE

CROSS REFERENCE TO RELATED APPLICATION

This application claims the benefit under 35 USC § 119(e) of U.S. Provisional Application No. 62/596,296 filed Dec. 8, 2017, which is incorporated by reference in its entirety.

BACKGROUND OF INVENTION

The invention relates to seals used in valves generally and in particular embodiments, seals used in ball valves. Prior art ball valves typically have a valve ball positioned between two valve seats with O-ring type seals interfacing between the valve seats and the valve ball. FIG. 1A shows a cross-section of a cartridge type ball valve such as seen in U.S. Pat. No. 9,488,033, which is incorporated by reference herein in its entirety. The cartridge valve 75 includes upper and lower valve seat carriers 76 and 77. The valve seat carriers hold the upper and lower valve seats 78 and 79. The valve ball 81 is positioned between the valve seats 78 and 79. O-rings 80 are position in grooves on the surface of the valve seats facing the valve ball and provide a seal between the valve seats and valve ball. The stem 84 is rotated in order to rotate valve ball 80 and thereby open and close the ball valve. Although not shown in FIG. 1A, the above elements will typically be inserted into a tubular cartridge housing. As is clear from FIG. 1B, the valve seat carriers and valve seats are annular in shape forming a central valve passage 86, which is opened and closed when the ball passage 87 is aligned and misaligned with the valve central passage 86. The central axis 88 (also referred to as the "central longitudinal axis") of the valve extends through and parallel with central passage 86.

The conventional O-rings between the valve seats and valve ball often exhibit certain drawbacks in use. For example, the pressurized fluids being controlled by the valve may sometimes force the O-ring from its groove in the valve seat. Similarly, the valve ball moving from its open to closed position (or vis-a-versa) can have a tendency to drag the O-ring from its groove, e.g., when the edge of passage 87 catches on the O-ring. A sealing system overcoming these drawbacks would be a significant improvement in the art.

DETAILED DESCRIPTION OF SELECTED EMBODIMENTS

Figure 1A:
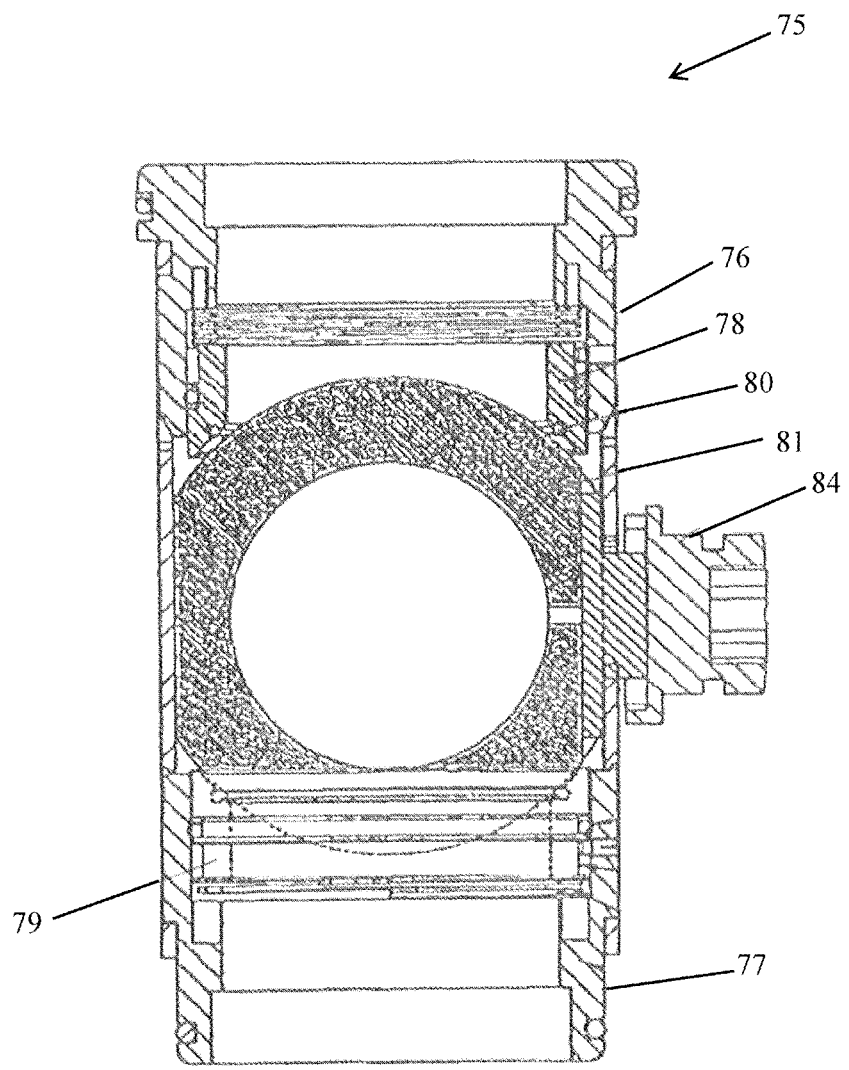
FIG. 1A illustrates a cross-section of a prior art cartridge type ball valve.
Figure 1B:
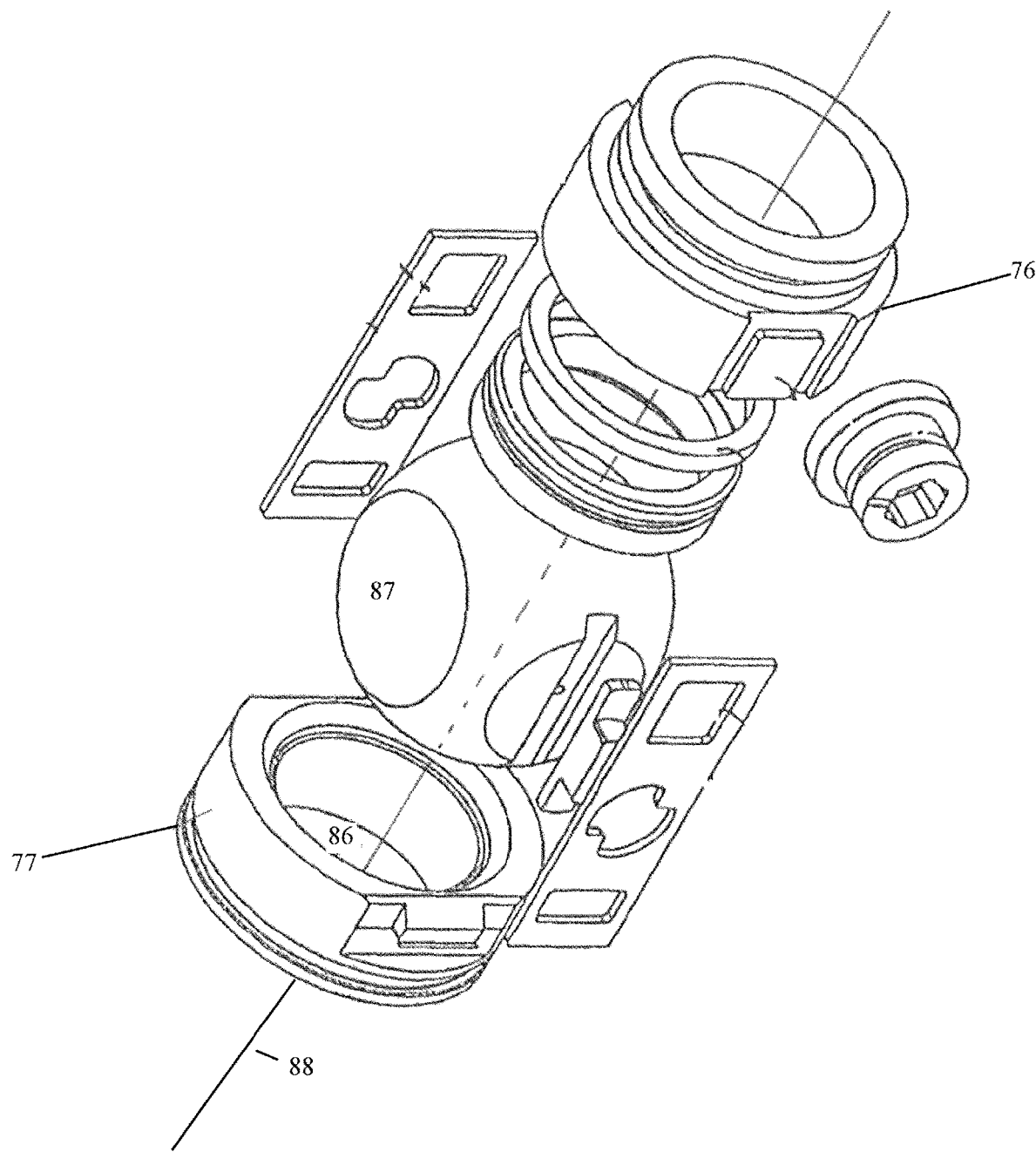
FIG. 1B illustrates an exploded view of the FIG. 1A ball valve.
Figure 2:
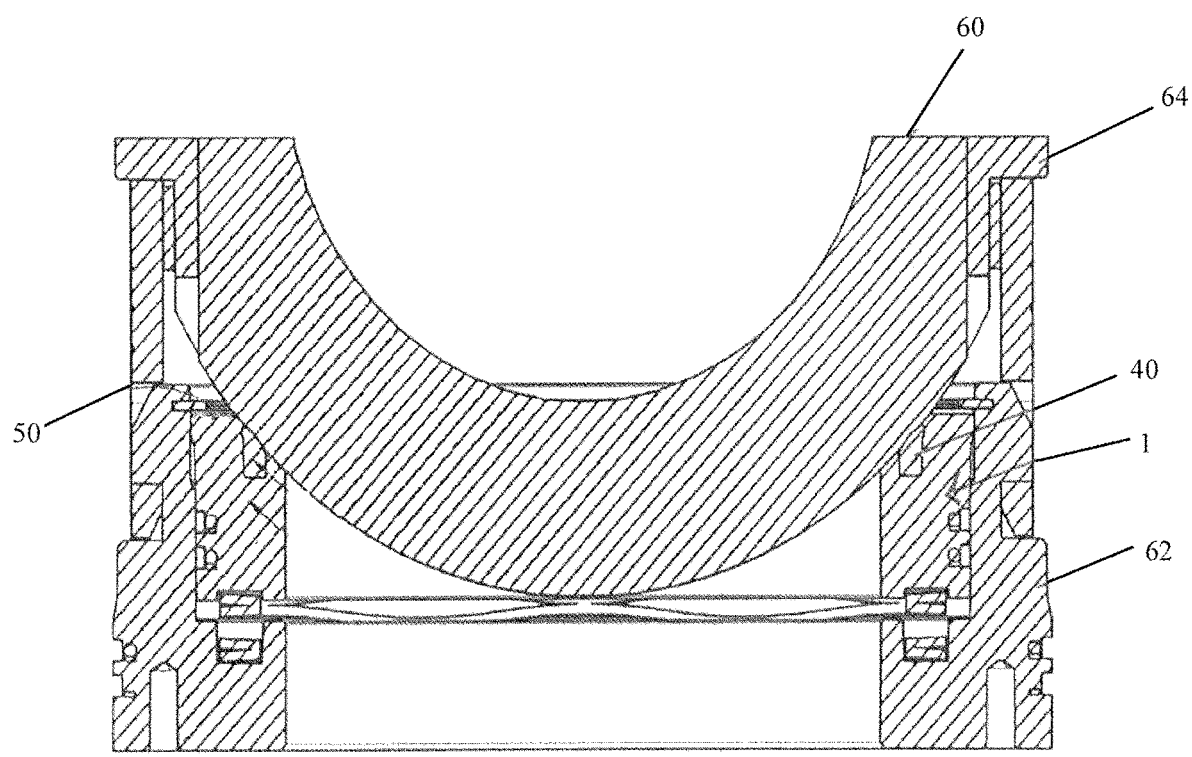
FIG. 2 illustrates a partial cross-section of one embodiment of the valve seat the present invention.

FIG. 2 is a partial cross-section illustrating one embodiment of the valve seat 1 and the overall valve of the present invention. FIG. 2 suggests how the valve seat 1 includes the seal element 40 and is positioned in valve seat carrier 62. The valve ball 60 will engage valve seat 1 (a "lower" valve seat as shown in FIG. 2) and seal element 40 and be rotated by valve stem 64. Although not shown in FIG. 2, it will be understood that a similar "upper" valve seat 1 and valve seat carrier 62 will engage the opposing surface of valve ball 60 much as seen in FIG. 1A. It will also be understood that the valve seat has an annular or toroidal shape as seen in FIG. 1B. The other elements of the overall valve, including the valve seat stop 50, are similar to the corresponding elements seen in U.S. Pat. No. 9,488,033.

Figure 3B:
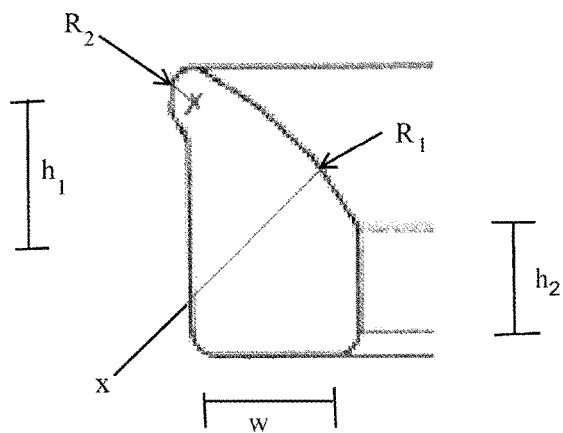
FIG. 3B illustrates an enlarged section of the seal element.
Figure 3A:
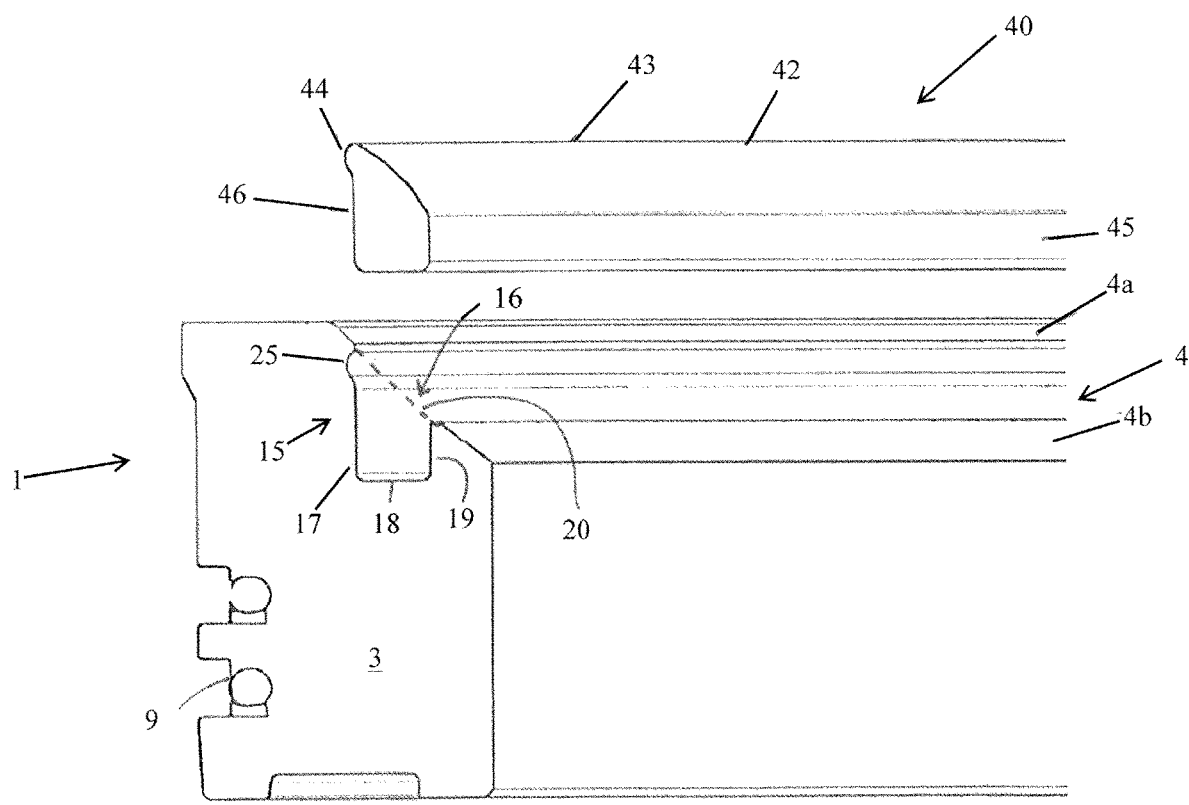
FIG. 3A illustrates an enlarged section of the valve seat of FIG. 2 with the seal element removed.

FIG. 3A illustrates in more detail the valve seat 1 and the seal element 40 (removed from valve seat 1 in FIG. 3A). Valve seat 1 will generally include seat body 3 having the seal pocket 15 formed therein. The seal groove 9 will accommodate a conventional seal to create sealing contact with the inner surface of valve seat carrier 62. The surface of seat body 3 facing the valve ball (i.e., the upper surface of the lower valve seat) will include a concave seating surface 4 having a curvature corresponding to (i.e., configured to seal against) the convex surface of the valve ball 60. The seating surface 4 is divided by seating pocket 15 into an inner seating surface 4b and outer seating surface 4a. Seating surface 4b is the "inner" surface in the sense that it is closer in the radial direction to the center of the annular valve seat, while seating surface 4a is the "outer" surface as it is more distant from the valve seat center. In the illustrated embodiment, the width of the inner seating surface 4b is wider, for example by at least 50%, than outer seating surface 4a. In the FIG. 3A embodiment, the seal pocket 15 is formed with a throat 16 which extends downward from the level of the concave seating surface 4. Seal pocket 15 further includes the outer sidewall 17, the shorter inner sidewall 19, and the bottom wall 18. However, inner sidewall 19 need not be shorter in all embodiments. Again, the "inner" and "outer" terms designate positions relative to the center of the valve seat. In the FIG. 3A embodiment, the outer sidewall 17 and inner sidewall 19 extend generally parallel to the direction of the central axis 88 (see FIG. 1B) of the overall valve. FIG. 3A further shows the concave retaining groove 25 formed in the outer sidewall 17 at a point just below outer seating surface 4a. In the nonlimiting example of FIG. 3A embodiment, outer sidewall 17 has a height of between about 0.09 and about 0.32 inches, while inner sidewall 19 has a height of between about 0.06 and about 0.19 inches. In certain embodiments, the length of the inner and outer sidewalls are at least 50% the width of throat 16. The dashed line 20 in FIG. 3A illustrates the imaginary curvature path if the concave seating surface 4 was continuous between outer seating surface 4a and inner seating surface 4b.

Figure 6A:
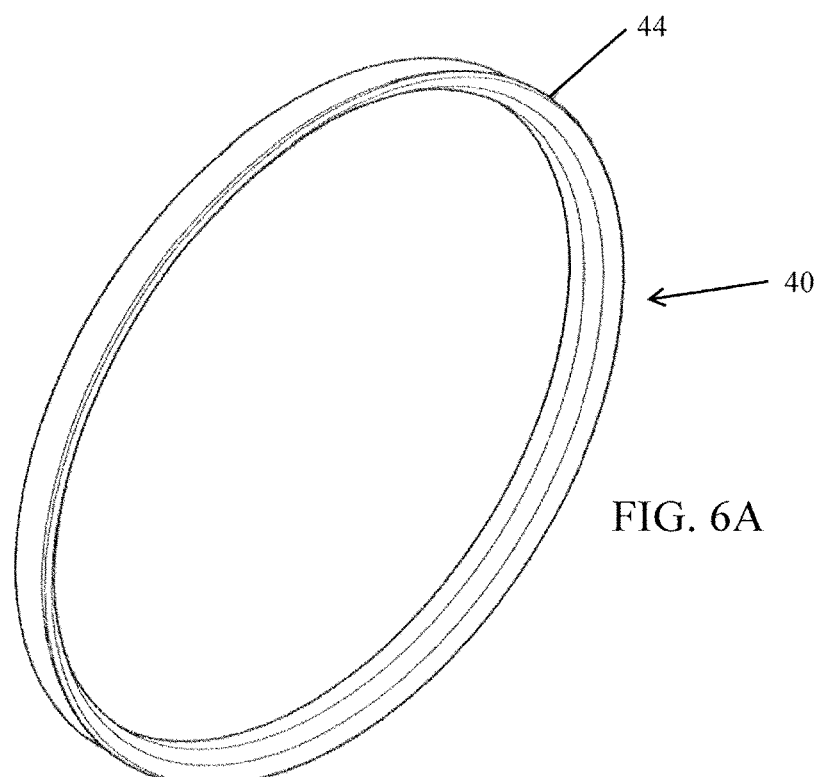
FIGS. 6A and 6B illustrate reverse perspective views of one embodiment of the seal element.
Figure 6B:
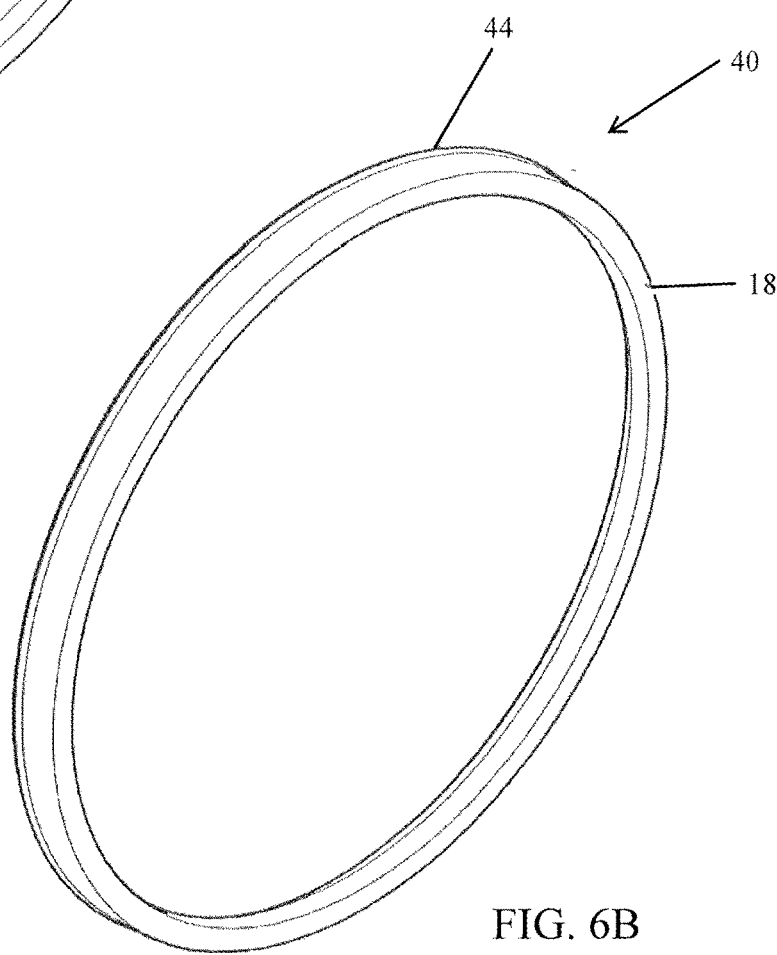

FIG. 3A also illustrates the seal element 40 prior to its being inserted into seal pocket 15. This embodiment of seal element 40 has a body 41 generally shaped to mirror the dimensions of seal pocket 15. This includes the outer face 46, the inner face 45, and the sealing face 42. The general ring-like shape of this embodiment of seal member 40 can be seen in FIGS. 6A and 6B. In the illustrated embodiment (as seen in FIG. 3B), sealing surface 42 has a generally convex curvature with a radius of curvature $R_1$ ranging from between about 0.050 and about 1.2 inches, and more preferably, between about 0.1 and about 0.6 inches. The extended lip 44 transitions from the upper end 43 of sealing face 42, extending radially outward beyond the outer face 46, before curving back into outer face 46. In many embodiments, the flat inner face 45 of the seal element 40 is sufficiently long that it engages the inner pocket sidewall 19 prior to the extended lip 44 moving below the valve seat's seating surface 4a. As one example of a valve seat with an ID of 6.5 inches, the seal member could have a bottom width of 0.25 inches, an outer face height of 0.303 inches, and an inner face height of 0.17 inches.

In certain embodiments, the radius of curvature $R_2$ of the extended lip 44 will be between about 0.01 and about 0.1 inches. Likewise, the material from which seal element 40 is constructed should be sufficiently flexible to allow extended lip 44 to bend past seating surface 4a, but rigid enough that the seal member may be pressed into seal pocket 15. An example of seal material rigidity could be between about 40 and about 80 (or any sub-range there between) on a Shore A hardness scale. In a preferred embodiment, the seal member 40 is constructed of glass filled or impregnated Teflon, such as FLON 700 25% glass filled PTFE available from Flontech USA, LLC of Pittston, Pa., but could be of any conventional or future developed material having the characteristics required to perform its sealing function. In one example, seal member 40 has sufficient rigidity to hold ball member 40 off the seating surface 4 at pressures (i.e., pressure on the opposing surface of the ball) under 350 psi, but then deflects sufficiently to all ball member 40 to engage the seating surface 4 at pressures over 2,000 psi.

Figure 4:
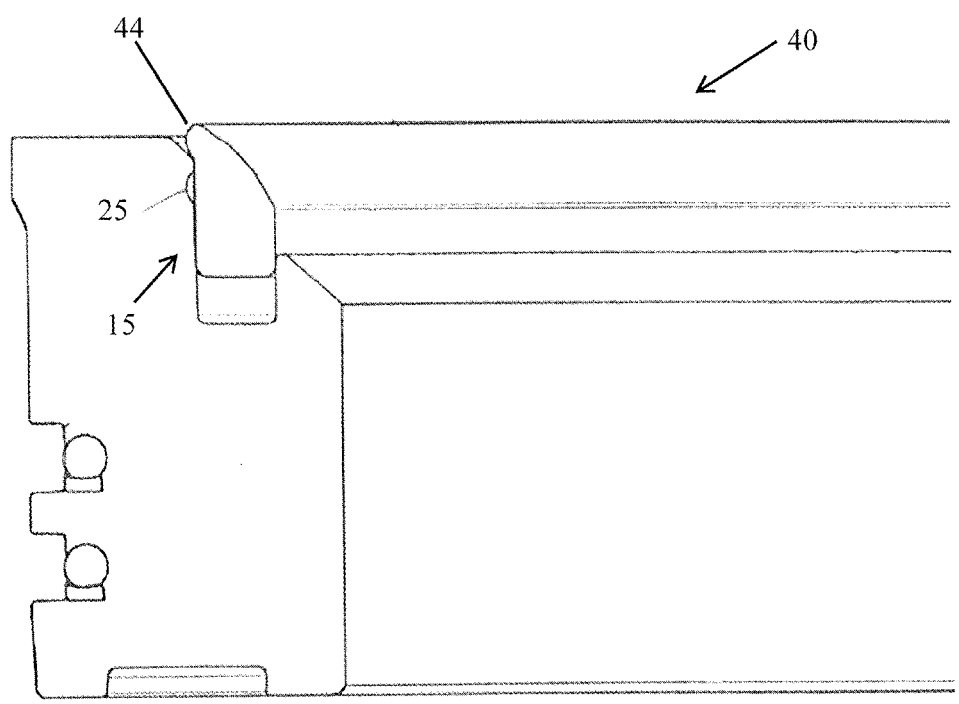
FIG. 4 illustrates the valve seat with the seal element partial inserted into a seal pocket.
Figure 5:
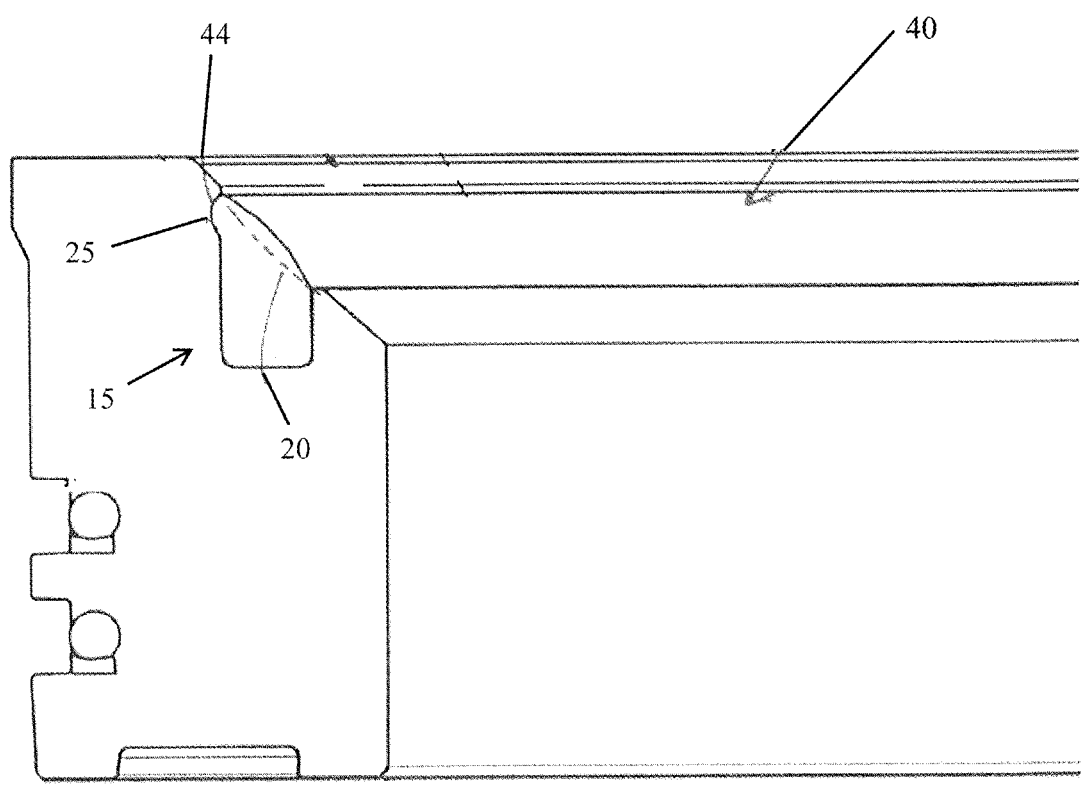
FIG. 5 illustrates the seal element fully inserted into the seal pocket.

FIG. 4 suggests how the lower portion of seal element 40 is inserted into seal pocket 15. FIG. 4 shows seal element 40 partially inserted into seal pocket 15 with the extended lip 44 not yet engaged with retaining groove 25. FIG. 5 shows seal element 40 completely inserted into seal pocket 15. It can be seen that extended lip 44 rests in retaining groove 25. Additionally, the upper end 43 of seal element 40 rests below the edge of outer seating surface 4a. The mid-portion of sealing face 42 extends above the curvature path 20 of seating surface 4. In many embodiments, this mid-portion of the sealing face will extend between about 0.020 and about 0.075 inches above the curvature path of the seating surface.

Figure 7:
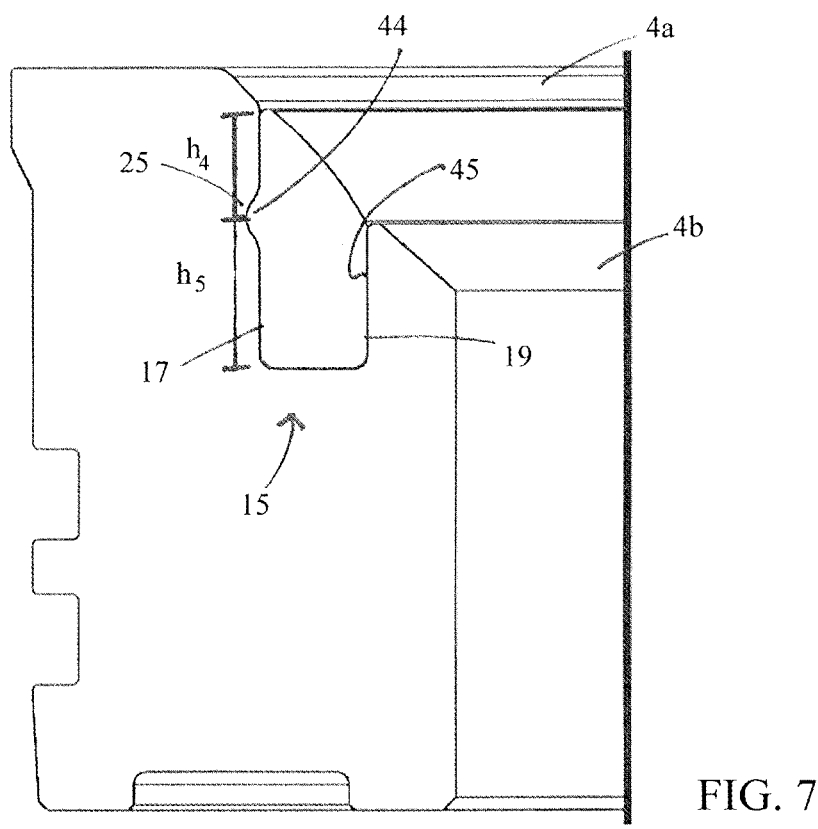
FIG. 7 illustrates a first alternative embodiment of the valve seat.
Figure 10:
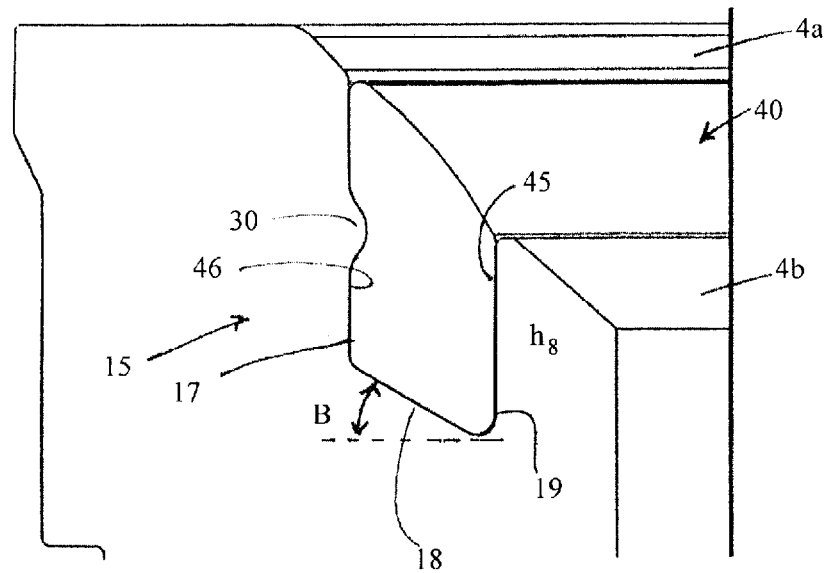
FIG. 10 illustrates a fourth alternative embodiment of the valve seat.

FIG. 7 illustrates a modified embodiment where retaining groove 25 is positioned midway down outer pocket sidewall 17. The extended lip 44 on seal element 40 has been positioned at a corresponding location down the outer face 46. As described above, the lower portion of seal element 40 ($h_5$ in FIG. 7) should be sufficiently long that, when inserting seal element 40 into seal pocket 15, inner face 45 of the seal element 40 at least begins to move into seal pocket 15 (i.e., engaging inner sidewall 19) before extended lip 44 encounters outer seating surface 4a. A variation of this embodiment is seen in FIG. 10. In the FIG. 10 example, the bottom wall 18 of seal pocket 15 is not perpendicular to inner sidewall 19, but rather forms the angle β with such perpendicular line. Bottom wall 18 inclines from outer sidewall 17 to inner sidewall 19 in a "downward" direction, i.e., in a direction away from throat 16 of seal pocket 15. It can be seen how, upon insertion of the seal element 40, the lower edge of seal inner face 45 engages inner sidewall 19 prior to the lip or groove on the seal moving against outer seating surface 4a.

Figure 8:
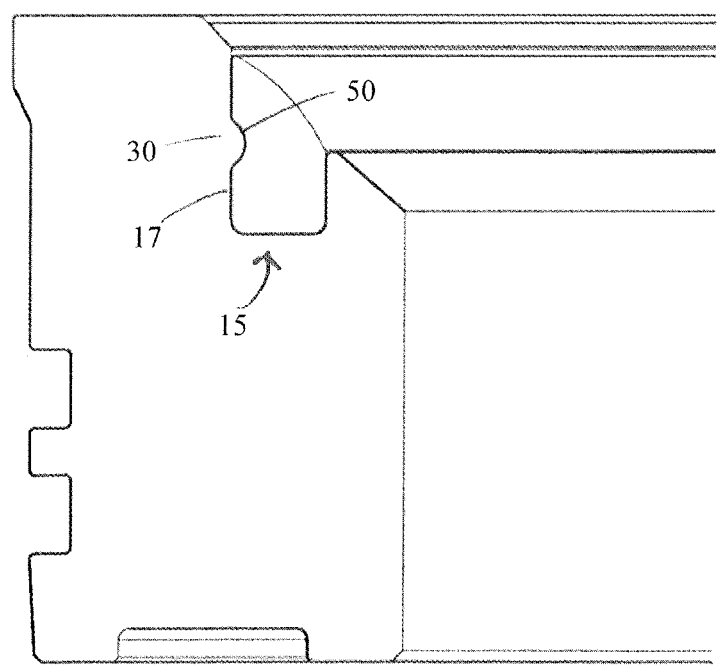
FIG. 8 illustrate a second alternative embodiment of the valve seat.

In still further embodiments not illustrated, retaining groove 25 could be positioned on the inner pocket sidewall 19. Likewise, as suggested in FIG. 8, other embodiments could reverse the concavity and convexity of seal groove 25 and extended lip 44. For example, FIG. 8 shows an extended lip 30 could be formed on outer wall 17 and a groove 50 on seal member 40. The seal lip (whether convex or concave) is considered to have a "mating surface" with the opposing portion of the seal pocket (whether concave or convex).

Figure 9B:
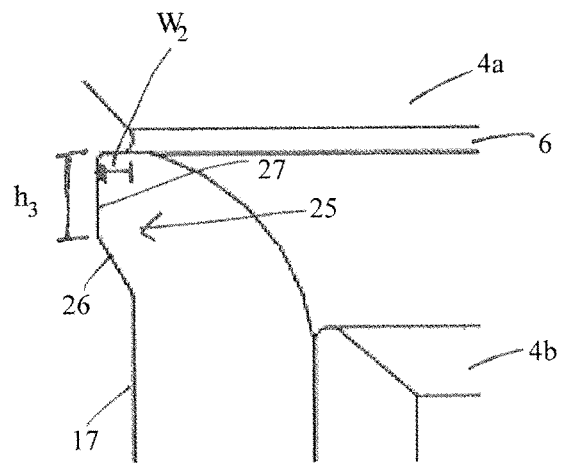
FIG. 9B illustrates a detailed section of the FIG. 9A embodiment.
Figure 9A:
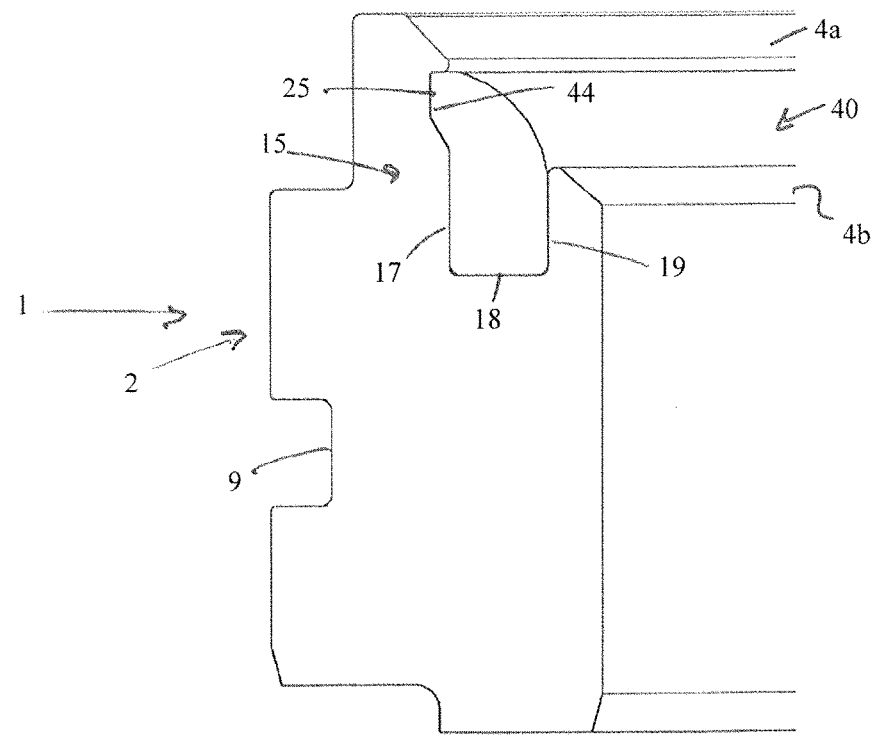
FIG. 9A illustrates a third alternative embodiment of the valve seat.

FIGS. 9A and 9B illustrate a still further embodiment of the invention. This version of valve seat 1 includes a single outer circumference seal groove 9 (as opposed two seal grooves in the previous embodiments). As with the previous embodiments, the valve seat of FIG. 9A includes a seat body 2 having a concave annular outer seating surface 4a and inner seating surface 4b, separated by the seal pocket 15. This embodiment of seal pocket 15 likewise includes an outer sidewall 17, a bottom wall 18, and an inner sidewall 19. One difference with the FIG. 9A embodiment is in the shape of the retaining groove 25. As most clearly seen in FIG. 9B, the rear face 27 of retaining groove 25 forms a substantially vertical, straight line extending from a lower edge 6 of the outer seating surface 4a. As used in the context of FIGS. 9A and 9B, "vertical" means parallel to central axis 88 of the valve (and thus valve seat) as seen in FIG. 1B, while "substantially" typically means within +/−20° from vertical. FIG. 9B illustrates how the rear face 27 extends radially outward beyond the outer sidewall 17 by a distance $W_2$. In preferred embodiments, $W_2$ is between 0.020 inches and 0.040 inches and the rear face 27 has height $h_3$ of between 0.030 inches and 0.090 inches. In these embodiments, the rear face of the retaining groove forms a right angle with respect to an undercut of the lower edge of the outer seating surface (i.e., the orientation of the distance $W_2$ is at substantially right angles with the height $h_3$).

FIG. 9A also shows how retaining groove 25 further includes the transition section 26 which slopes inward and downward from the retaining groove rear face 27 to the retaining groove outer wall 17. In this embodiment, the slope of transition section 26 is between 20° and 70° (or any subrange in between) relative to the line of outer wall 17. In certain preferred embodiments, the rear face 27 of the retaining groove 25 will have a height slightly greater than (e.g., at least 0.000 to 0.003 inches greater than) the corresponding height of the extended lip 44 of the seal element 40. It will be understood that forming the height of the extended lip 44 somewhat less than the height of rear face 27 allows seal element 40 to more reliably be fully inserted into seal pocket 15 without placing the seal material in undue compression, which could urge seal element 40 to become dislodged from seal pocket 15.

Figure 11:
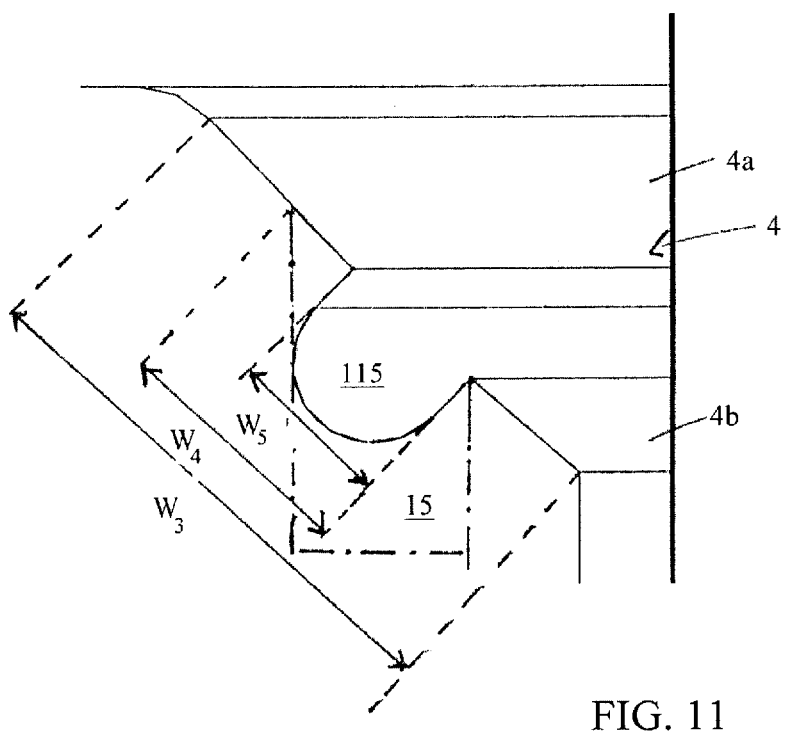
FIG. 11 illustrates the comparative width of the seal pocket throat and the seating surface.

FIG. 11 illustrates how the throats of the above described seal pockets 15 provide a greater sealing area than the corresponding throats of conventional o-ring seal pockets 115. FIG. 11 shows the seal pocket 115 formed for a conventional o-ring. The throat width of seal pocket 115 approximates the o-ring diameter and is represented by the distance $W_5$. The width of the seating surface 4 is represented by the distance $W_3$. For conventional o-ring seal pockets, $W_5$ is typically less than 40% of $W_3$. The throat width of seal pocket 15 is represented by the distance $W_4$. In many embodiments described herein, the throat width of the seal pockets 15 will be at least about 45% of $W_3$ and less than about 80% of $W_3$.

The invention also includes methods of manufacturing the above described valve seats. These methods include providing a ball valve seat having a concave seating surface and a central longitudinal axis. Then a seal pocket is formed in the concave seating surface with the seal pocket having the shape and dimensions as described herein. In certain embodiments, the valve seat already has a seal pocket for a conventional o-ring and this seal pocket is re-shaped into the substantial rectangular seal pocket having a wider throat as seen in the Figures.

Although many aspects of the invention have been described in terms of certain specific embodiments illustrated above, many modifications and variations will be obvious to those skilled in the art to which the invention pertains. All such modifications and variations are intended to come within the scope of the following claims. The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments+/−15%, or possibly as much as +/−20%. Similarly, the term "substantially" will typically mean at least 85% to 99% of the characteristic modified by the term. For example, "substantially all" will mean at least 85%, at least 90%, or at least 95%, etc.

The invention claimed is:

1. A valve comprising:
   two valve seats;
   a valve ball positioned between the two valve seats;
   wherein at least one of the two valve seats includes:
   (a) a valve seat body with (i) a central passage and a central axis extending along the central passage, and (ii) a circumferential concave seating surface configured to mate with a curvature of the valve ball, the circumferential concave seating surface including an outer and inner circumferential concave seating surface;
   (b) a seal pocket formed within the valve seat body, the seal pocket having (i) a throat formed in the circumferential concave seating surface, (ii) an outer pocket sidewall, and (iii) an inner pocket sidewall, the outer and inner pocket sidewalls being oriented substantially parallel with the central axis:
   (c) a retaining groove below the throat on either the outer pocket sidewall or the inner pocket sidewall; and
   (d) a flexible seal element shaped for positioning in the seal pocket, the flexible seal element including (i) an extended lip configured to rest within the retaining groove when the flexible seal element is seated in the seal pocket, (ii) a convex sealing face including a convex upper end extending to rest below the valve seat's outer circumferential concave seating surface and a mid-portion extending upward above a curvature path of the circumferential concave seating surface, and (iii) an inner face of the flexible seal element sufficiently long that the inner face engages the inner pocket sidewall prior to the extended lip moving below the valve seat's circumferential concave seating surface.

2. The valve according to claim 1, wherein the inner circumferential concave seating surface is at least 50% wider than the outer circumferential concave seating surface.

3. The valve according to claim 1, wherein the flexible seal element holds the valve ball off the circumferential concave seating surface at pressures under 350 psi, but at pressures over 2000 psi, the flexible seal element deflects sufficiently to allow the valve ball to engage the circumferential concave seating surface.

4. The valve according to claim 1, wherein a width of the throat ($W_4$) is less than about 80% of a width of the circumferential concave seating surface ($W_3$).

5. The valve according to claim 4, wherein the width ($W_4$) of the throat is at least 45% of the width of the circumferential concave seating surface ($W_3$).

6. The valve according to claim 1, wherein the convex sealing face includes a lower convex end extending to rest under the inner circumferential concave seating surface.

7. The valve according to claim 6, wherein the retaining groove is positioned along an upper end of the outer pocket sidewall.

8. The valve according to claim 6, wherein the flexible seal element incudes (i) an outer face with the extended lip formed at a top of the outer face, (ii) the inner face shorter than the outer face, and (iii) the convex sealing face transitioning from the outer face to the inner face.

9. The valve according to claim 1, wherein the convex sealing face has a curvature allowing the mid-portion of the convex sealing face extends at least 0.020 inches above the curvature path of the circumferential concave seating surface.

10. The valve according to claim 9, wherein a cross-section of the retaining groove includes a substantially vertical, straight line rear face extending from a lower edge of the outer circumferential concave seating surface.

11. The valve according to claim 10, wherein a transition section of the retaining groove slopes inward and downward from the substantially vertical, straight line rear face to the outer pocket sidewall.

12. The valve according to claim 11, wherein the substantially vertical, straight line rear face extends radially outward beyond the outer pocket sidewall at least 0.020 inches.

13. The valve according to claim 10, wherein the substantially vertical, straight line rear face has a height of at least 0.001 inches greater than a corresponding height of the extended lip of the seal element.

* * * * *